United States Patent
Maekawa et al.

[11] Patent Number: 5,167,164
[45] Date of Patent: Dec. 1, 1992

[54] 2-WHEEL/4-WHEEL DRIVE SWITCHING APPARATUS

[75] Inventors: Masatoshi Maekawa, Kosai; Yoshiaki Tajima, Hamamatsu; Sadao Namioka, Brussels, all of Japan

[73] Assignees: Fuji Univance Corporation, Kosai; Nissan Motor Co., Ltd., Yokohama, both of Japan

[21] Appl. No.: 831,574

[22] Filed: Feb. 4, 1992

[30] Foreign Application Priority Data

Feb. 26, 1991 [JP] Japan .................. 3-008902

[51] Int. Cl.$^5$ .................................... B60K 20/02
[52] U.S. Cl. .................. 74/473 R; 74/422; 74/89.17
[58] Field of Search .......... 74/89.11, 89.14, 89.16, 74/89.17, 89.18, 89.19, 422, 473 R

[56] References Cited

U.S. PATENT DOCUMENTS

| | | | |
|---|---|---|---|
| 842,416 | 1/1907 | Nelson | 74/89.17 X |
| 1,673,952 | 6/1928 | Schmidt | 74/473 R |
| 2,859,628 | 11/1958 | Arko | 74/422 |
| 4,449,416 | 5/1984 | Huitema | 74/473 R X |
| 4,520,994 | 6/1985 | DeWald | 74/422 |
| 4,805,472 | 2/1989 | Aoki et al. | 74/89.14 X |
| 4,987,791 | 1/1991 | Nakahashi et al. | 74/89.14 X |
| 5,015,149 | 5/1991 | Weiss | 74/89.17 X |

Primary Examiner—Leslie A. Braun
Assistant Examiner—Ryan W. Massey
Attorney, Agent, or Firm—Wenderoth, Lind & Ponack

[57] ABSTRACT

The rotational speed of a motor is reduced by a worm gear and a worm wheel and the reduced rotation is transferred to a first pinion gear. A first moving plate is moved along a pair of shafts. A second moving plate is provided for the first moving plate by inserting to the same pair of shafts. A first coil spring is interposed between a retaining portion of a shaft inserting hole of the first moving plate of one of the shafts and a retaining portion of a shaft inserting hole of the second moving plate. The first coil spring is compressed by the movement of the first moving plate upon switching to the 4-wheel drive, thereby accumulating the force. A second coil spring is interposed between a retaining portion of the shaft inserting hole of the first moving plate of the other shaft and a retaining portion of the shaft inserting hole of the second moving plate. The second coil spring is compressed by the movement of the first moving plate upon switching to the 2-wheel drive, thereby accumulating the force. When the switching enable state of a coupling sleeve from the 4-wheel drive to the 2-wheel drive is satisfied, a second pinion gear is rotated by a rack gear of the plate by the movement of the second moving plate due to the force accumulated in the spring. A shift rod is shifted through a planetary gear mechanism by the engagement with the rack gear of the third pinion gear.

6 Claims, 3 Drawing Sheets

2-WHEEL/4-WHEEL DRIVE SWITCHING APPARATUS

BACKGROUND OF THE INVENTION

The invention relates to a 2-wheel/4-wheel drive switching apparatus which is used in a 4-wheel drive vehicle and, more particularly, to a 2-wheel/4-wheel drive switching apparatus in which a force by a motor driving is accumulated in a spring and, after that, when movement conditions to the 2-wheel drive position or 4-wheel drive position of a coupling sleeve are satisfied, the coupling sleeve is shifted by the force accumulated.

DESCRIPTION OF THE RELATED BACKGROUND ARTS

As a conventional 2-wheel/4-wheel drive switching apparatus, for instance, there are apparatuses disclosed in JP-U-63-44261 and JP-A-63-87317 (U.S. Pat. No. 4,805,472).

According to the 2-wheel/4-wheel drive switching apparatus of JP-U-63-44261, for instance, when a switching operation to the 4-wheel drive is executed by a switch, a flat spiral spring is wound up by the rotation of a motor to thereby accumulate the force, the apparatus waits until a state in which the coupling sleeve can come into engagement with the gear is obtained, and when the engagement enable state is derived, the coupling sleeve is shifted to the 4-wheel drive position by using the force accumulated in the flat spiral spring. On the other hand, when a switching operation to the 2-wheel drive is performed by the switch, the flat spiral spring is wound up by the reverse rotation of the motor to thereby accumulate the force, the apparatus waits until a state in which the coupling sleeve can be pulled and come into disengagement with the gear is derived, and when the pulling disengagement enable state is obtained, the coupling sleeve is shifted to the 2-wheel drive position by using the force accumulated in the flat spiral spring.

According to the 2-wheel/4-wheel drive switching apparatus of JP-A-63-87317 (U.S. Pat. No. 4,805,472), when a switching operation to the 4-wheel drive or a switching operation to the 2-wheel drive is executed by a switch, a torsion spring is compressed by the rotation of a motor to thereby accumulate a force, the apparatus waits until an engagement enable state or a pulling disengagement enable state between a coupling sleeve and a gear is obtained, and when the gear engagement state or the pulling disengagement enable state is obtained, the coupling sleeve is shifted to the 4-wheel drive or 2-wheel drive position by using the force accumulated in the torsion spring.

In such conventional 2-wheel/4-wheel drive switching apparatuses, however, since the flat spiral spring or torsion spring has been used as a mechanism to accumulate the operating force in the waiting state until the shift enable state is satisfied, there are problems such that the mass productivity is low and the costs rise.

Since a general gear train using a plain gear to transfer a motive power from the waiting mechanism to the shift rod is used, when a reduction ratio is set to a large value to increase the driving force, the space increases and there is also a problem such that it is impossible to miniaturize.

SUMMARY OF THE INVENTION

It is an object of the invention to provide a 2-wheel/4-wheel drive switching apparatus in which a mass productivity is high and the costs can be reduced.

Another object of the invention is to provide a 2-wheel/4-wheel drive switching apparatus which can realize the miniaturization even when a reduction ratio is large.

Still another object of the invention is to provide a 2-wheel/4-wheel drive switching apparatus using a coil spring as a spring for a waiting mechanism.

Further another object of the invention is to provide a 2-wheel/4-wheel drive switching apparatus using a planetary gear mechanism to transfer a motive power from the waiting mechanism to a shift rod.

According to the invention, the rotation of a motor is reduced by using a worm and a worm wheel and is transferred to a first pinion gear, thereby driving a first moving plate having a first rack gear which is come into engagement with a first pinion gear. A second moving plate is provided for the first moving plate so as to be relatively movable by penetrating two shafts. Two retaining portions provided at diagonal positions of the first moving plate are penetrated through each shaft. Two retaining portions provided at the opposite diagonal positions of the second moving plates are penetrated through each shaft so as to face the above two retaining portions. Each coil spring is inserted on the shaft between two confronting retaining portions of the different plates.

A second rack gear is formed on the second moving plate. The shaft of the pinion engaged with the second rack gear is coupled to a sun gear of the planetary gear mechanism. The planetary gear mechanism has a plurality of planetary gears supported around the sun gear by a carrier and has a ring gear fixed to the outside of the planetary gears. The planetary gear mechanism applies the rotation to the sun gear and takes out the reduced rotational output from the carrier.

A third pinion gear is provided at the end of the output shaft attached to the carrier and is come into engagement with a rack gear of a shift rod. A shift fork to switch the gears for the 2-wheel drive and the 4-wheel drive is fixed to the front edge of the shift rod.

By executing the switching operation to switch from the 2-wheel drive to the 4-wheel drive or from the 4-wheel drive to the 2-wheel drive, the motor is rotated in a predetermined direction. The rotation of the motor is reduced by the engagement with the worm and the worm wheel and is transferred to the first pinion gear and moves the first moving plate by the engagement with the first rack gear. When the first moving plate moves, the second moving plate side doesn't move because the coupling sleeve is not in the shift enable state. A coil spring inserted between the first and second moving plates is compressed and the driving force is accumulated.

When the shift enable state is obtained between the 2-wheel drive and the 4-wheel drive, the driving force accumulated in the coil spring moves the second moving plate, thereby rotating the sun gear of the planetary gear mechanism by the rotation of the second pinion gear by the second rack gear formed on the second moving plate. The planetary gear mechanism causes a reduced rotating force from the carrier by the conditions of the sun gear input and the fixed ring gear. The shift rod is moved from the third pinion gear provided for the output shaft by the rack gear of the shift rod, thereby shifting the coupling sleeve to the 4-wheel or 2-wheel drive position.

As mentioned above, since a pair of coil springs are used as springs for the waiting mechanism and a special spring such as a flat spiral spring or a torsion spring as in the conventional apparatus doesn't need to be used, the mass productivity is high, so that the costs can be reduced.

On the other hand, since a general plain gear train is not used to transfer a motive power from the waiting mechanism to the shift rod and the planetary gear mechanism is used, even when a reduction ratio is large, it is sufficient to provide a small space and the miniaturization can be realized.

The above and other objects, features, and advantages of the present invention will become more apparent from the following detailed description with reference to the drawings.

DETAILED DESCRIPTION OF THE PREFERRED EMBODIMENTS

Figure 1:
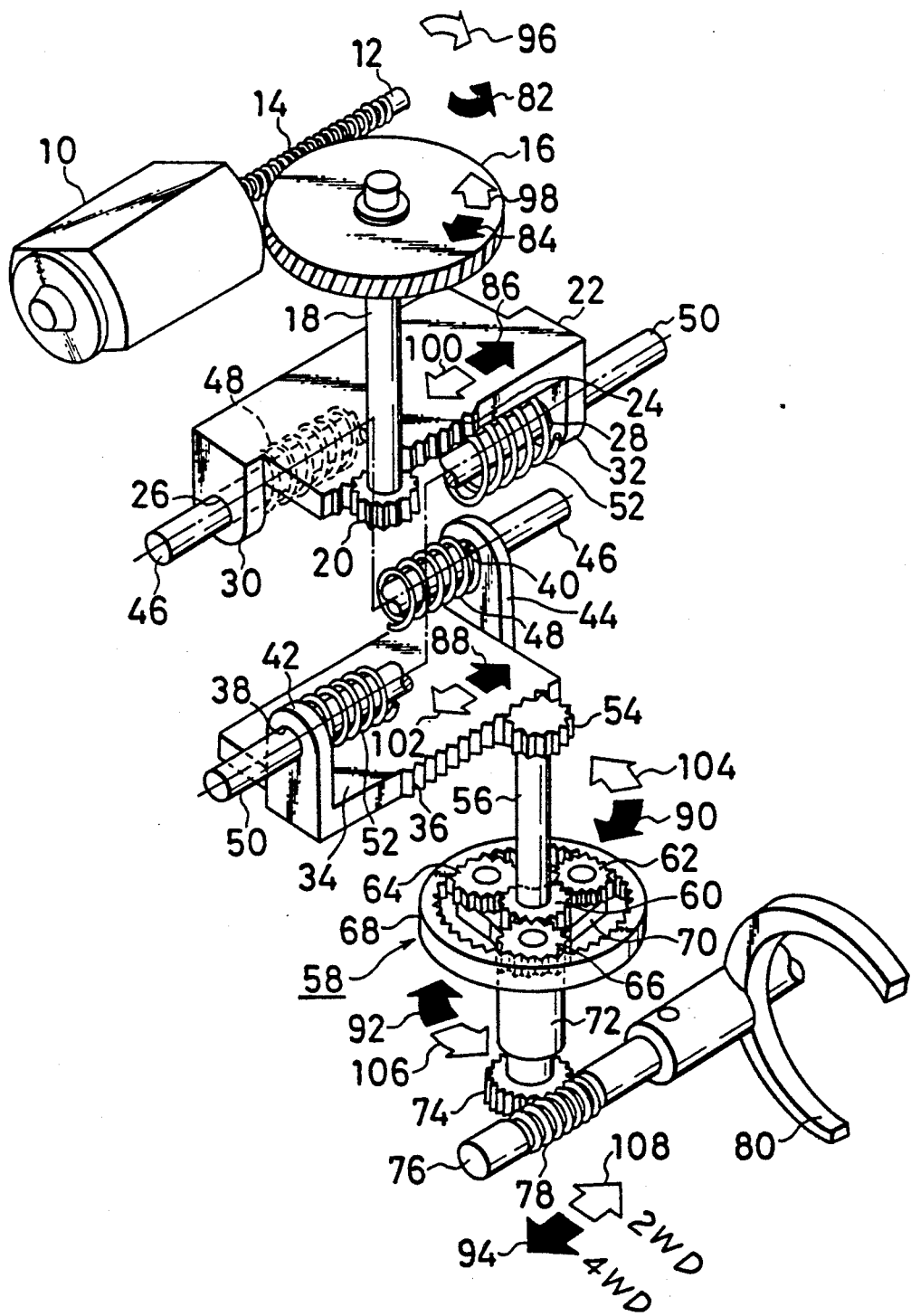
FIG. 1 is an explanatory diagram showing an embodiment of the invention.

In FIG. 1, reference numeral 10 denotes a DC motor. When a switch provided at a driver's seat is switched from the 2-wheel drive position to the 4-wheel drive position, the DC motor 10 rotates in the direction indicated by an arrow 82. On the other hand, when the switch is switched from the 4-wheel drive position to the 2-wheel drive position, the motor rotates in the direction of an arrow 96.

The DC motor 10 has a drive shaft 12. A worm gear 14 is formed on the drive shaft 12. A worm wheel 16 is come into engagement with the worm gear 14 from the direction perpendicular thereto. The worm wheel 16 is fixed to a shaft 18. A first pinion gear 20 is attached to the end of the shaft 18.

A reduction mechanism is constructed by the worm gear 14 and worm wheel 16. The rotation of the DC motor 10 is reduced and transferred to the first pinion gear 20.

Subsequently, a waiting mechanism using a first moving plate 22 and a second moving plate 34 is provided. A first rack gear 24 which is come into engagement with the first pinion gear 20 is formed on the first moving plate 22. A first retaining portion 30 and a second retaining portion 32 are integratedly formed at the diagonal positions of the first moving plate 22. Inserting holes 26 and 28 are formed in the retaining portions 30 and 32, respectively.

A second rack gear 36 is also formed on the second moving plate 34. A third retaining portion 42 and a fourth retaining portion 44 are integratedly formed at the diagonal positions of the second moving plate 34 different from those of the first moving plate 22. Inserting holes 38 and 40 are formed in the retaining portions 42 and 44, respectively.

A shaft 46 is slidably inserted into the inserting hole 26 formed in the retaining portion 30 of the first moving plate 22 and the inserting hole 40 formed in the retaining portion 44 of the second moving plate 34. On the shaft 46, a first coil spring 48 is inserted between the first retaining portion 30 and the fourth retaining portion 44. A shaft 50 is slidably inserted into the inserting hole 28 formed in the retaining portion 32 of the first moving plate 22 and the inserting hole 38 formed in the retaining portion 42 of the second moving plate 34. On the shaft 50, a second coil spring 52 is interposed between the second retaining portion 32 and the third retaining portion 42.

A second pinion gear 54 is come into engagement with the second rack gear 36 formed on the side surface of the second moving plate 34. The second pinion gear 54 is coupled with a sun gear 60 of a planetary gear mechanism 58 by the shaft 56.

The planetary gear mechanism 58 comprises: the sun gear 60; three planetary gears 62, 64, and 66 which are come into engagement with the sun gear 60; a fixed ring gear 68 which is come into engagement with the planetary gears 62, 64, and 66; and a carrier 70 to which the planetary gears 62, 64, and 66 are coupled. A shaft 72 is integratedly provided for the carrier 70. A third pinion gear 74 for output is coupled to the edge of the shaft 72.

A third rack gear 78 formed on a shift rod 76 arranged in the direction perpendicular to the third pinion gear 74 is come into engagement with the third pinion gear 74. A shift fork 80 to switch the 2-wheel drive and the 4-wheel drive is fixed to the shift rod 76. A coupling sleeve is provided for a pair of gears provided in the confronting portions of two shafts (not shown). When the shift fork 80 moves the coupling sleeve in the axial direction and a pair of gears are come into engagement with each other, the 4-wheel drive is set. When the engagement with one of the pair of gears is released, the 2-wheel drive is set.

The operation will now be described.

The case of switching from the 2-wheel drive to the 4-wheel drive will be first described.

When the operating switch is switched from the 2-wheel drive position to the 4-wheel drive position, the worm gear 14 is rotated in the direction shown by the arrow 82 by the driving of the DC motor 10. The rotation of the worm gear 14 is transferred to the worm wheel 16, so that the worm wheel 16 is rotated in the direction shown by an arrow 84 at a reduced speed. The worm wheel 16 rotates the first pinion gear 20 and moves the first moving plate 22 having the first rack gear 24 which is come into engagement with the first pinion gear 20 in the direction shown by an arrow 86.

At this time, since the phase of the coupling sleeve doesn't coincide with the phase of the gear on the 4-wheel driving side, even when the force is applied to the shift fork 80 in the direction shown by an arrow 94 by the driving of the DC motor 10, the coupling sleeve doesn't move, so that the second moving plate 34 is held in the fixed state. When the first moving plate 22 moves, therefore, the first coil spring 48 is compressed, the second coil spring 52 is extended, and the force is accumulated by the compression of the coil spring 48.

When the engagement phases of the coupling sleeve and the gear for switching from the 2-wheel drive to the 4-wheel drive in the above state are made coincident, the second moving plate 34 moves in the direction shown by an arrow 88 by the force accumulated by the compression of the first coil spring 48. The second pinion gear 54 which is come into engagement with the second rack gear 36 rotates in the direction shown by an arrow 90.

When the second pinion gear 54 rotates, the sun gear 60 of the planetary gear mechanism 58 rotates, the rotational speed is reduced at a predetermined reduction ratio, and the third pinion gear 74 rotates in the direction shown by an arrow 92.

Therefore, the shift rod 76 having the third rack gear 78 which is come into engagement with the third pinion gear 74 moves in the direction shown by the arrow 94. The coupling sleeve (not shown) is moved by the shift fork 80, thereby switching to the 4-wheel drive.

In the case of subsequently switching from the 4-wheel drive to the 2-wheel drive, the DC motor 10 rotates the worm gear 14 in the direction shown by the arrow 96 by the switching operation, thereby rotating the worm wheel 16 in the direction shown by an arrow 98 at a reduced speed. Thus, the first moving plate 22 moves in the direction shown by an arrow 100 and the apparatus enters a waiting state in which the force is accumulated by the compression of the second coil spring 52. After that, when the coupling sleeve is set into a state in which it can be pulled and removed, the second moving plate 34 moves in the direction shown by an arrow 102 and rotates the second pinion gear 54 in the direction shown by an arrow 104. The third pinion gear 74 rotates in the direction shown by an arrow 106, so that the shift rod 76 moves in the direction shown by an arrow 108, thereby switching to the 2-wheel drive.

As mentioned above, since the waiting mechanism is constructed by the first pinion gear 20, first moving plate 22, second moving plate 34, shafts 46 and 50, first and second coil springs 48 and 52, and second pinion gear 54, special springs such as flat spiral spring and torsion spring as in the conventional apparatus don't need to be used. Therefore, the mass productivity is high and the costs can be reduced.

On the other hand, since the planetary gear mechanism 58 is used without using the conventional general plain gear train in order to transfer the motive power from the waiting mechanism to the shift rod 76, even when a reduction ratio is small, it is sufficient to use a small space and the miniaturization can be realized.

Further, with respect to the speed reduction of the DC motor 10 as well, since the rotational speed is reduced by using the worm gear 14 and worm wheel 16, the further miniaturization can be accomplished.

Figure 2:
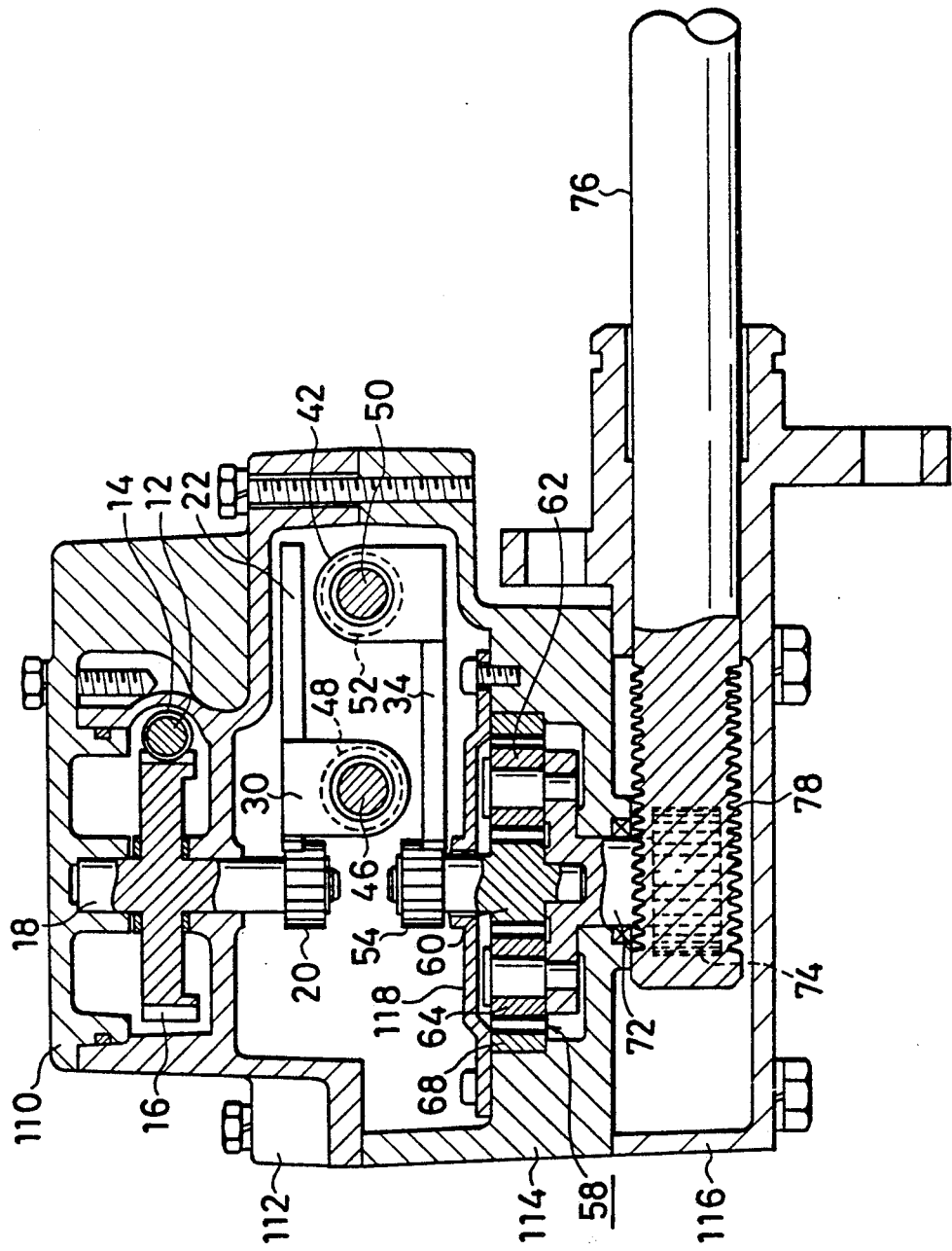
FIG. 2 is a cross sectional explanatory diagram showing an assembling state into casings in the embodiment of FIG. 1.

FIG. 2 is a cross sectional explanatory diagram showing an assembling state into casings according to the embodiment of FIG. 1. Divided casings 110, 112, 114, and 116 are used. The planetary gear mechanism 58 is assembled into the casing 114 by a pressing plate 118.

Figure 3:
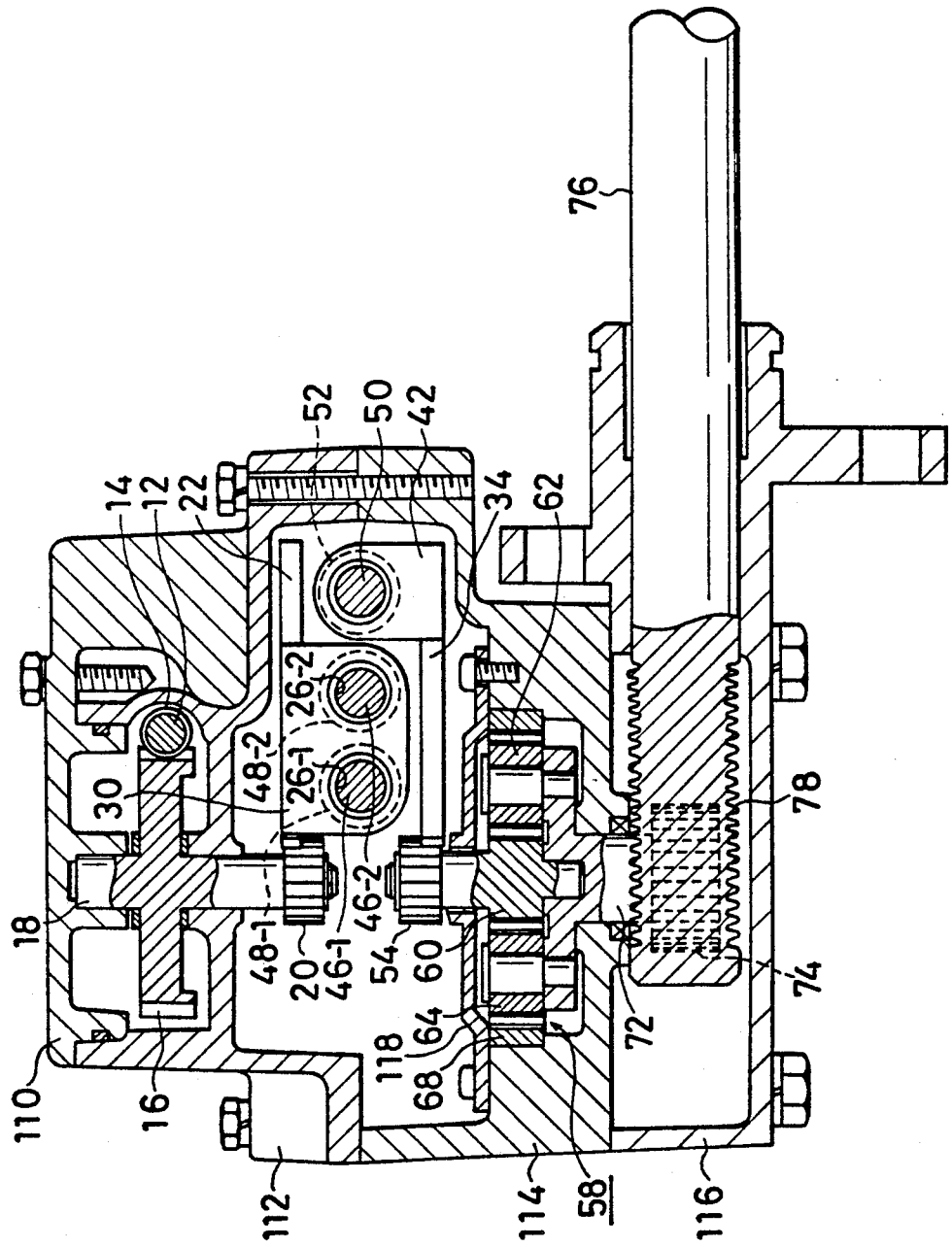
FIG. 3 is a cross sectional explanatory diagram showing another embodiment of the invention.

FIG. 3 is a cross sectional explanatory diagram showing an assembling state into casings according to another embodiment of the invention. The embodiment differs from the embodiment of FIG. 2 with respect to a point that two first coil springs 48-1 and 48-2 are used. This is because the switching force from the 2-wheel drive to the 4-wheel drive is larger than the switching force from the 4-wheel drive to the 2-wheel drive. For this purpose, it is sufficient that a spring constant of the first coil spring 48 is set to be larger than a spring constant of the second coil spring 52. In such a case, however, the number of parts and the number of managing steps increase and there is a possibility of the occurrence of an erroneous assembling work.

In the embodiment of FIG. 3, accordingly, two inserting holes 26-1 and 26-2 are formed in the retaining portion 30 of the first moving plate 22. Two shafts 46-1 and 46-2 are inserted into those inserting holes. Two inserting holes are also obviously formed in the retaining portion 44 of the second moving plate 34 which faces the retaining portion 30. The shafts 46-1 and 46-2 are inserted into those inserting holes. Two first coil springs 48-1 and 48-2 are attached to the shafts 46-1 and 46-2. Coil springs having the same spring constant are used for all the first coil springs 48-1 and 48-2 and the second coil spring 52.

As mentioned above, since it is sufficient to use the coil springs of the same spring constant, the mass productivity is high and the costs can be reduced.

What is claimed is:

1. A 2-wheel/4-wheel drive switching apparatus for shifting a coupling sleeve by a shift fork and for switching between a 2-wheel drive and a 4-wheel drive, comprising:

motor means which is rotated in a predetermined direction in association with a switching operation to switch to the 4-wheel drive and is rotated in an opposite direction in association with a switching operation to switch to the 2-wheel drive;

first reducing means for reducing an output rotational speed of the motor means and for transferring the reduced rotation to a first pinion gear;

first moving means which has a first rack gear which is come into engagement with the first pinion gear which is rotated by the first reducing means at a reduced speed and which is movable along a pair of shafts;

second moving means which is movably provided along said pair of shafts and further has a second rack gear;

first coil spring means which is arranged on one of said pair of shafts into which the first and second moving means are inserted and which is interposed between respective retaining portions having shaft inserting holes of the first and second moving means of said shaft and which is compressed upon switching to the 4-wheel drive and which is extended upon switching to the 2-wheel drive;

second coil spring means which is arranged on the other one of the pair of shafts into which the first and second moving means are inserted and which is interposed between respective retaining portions having the shaft inserting holes of the first and second moving means of said shaft and which is extended upon switching to the 4-wheel drive and which is compressed upon switching to the 2-wheel drive;

second reducing means for receiving a rotation of a second pinion gear which is come into engagement with the second rack gear and for transferring the reduced rotation to a third pinion gear; and shift rod means which has a third rack gear which is come into engagement with the third pinion gear and shifts the shift fork to a 4-wheel drive position or a 2-wheel drive position.

2. An apparatus according to claim 1, wherein the first reducing means comprises a worm gear which is rotated by the motor and a worm wheel.

3. An apparatus according to claim 1, wherein a planetary gear mechanism is used as said second reducing means.

4. An apparatus according to claim 3, wherein said planetary gear mechanism supplies the rotation from the second pinion gear to a sun gear, a plurality of rotatable planetary gears which are attached to a carrier are provided around the sun gear, further, a ring gear is fixed and arranged on the outside of the planetary gears, a speed of the input rotation of the sun gear is reduced, and the reduced rotation is taken out from an output shaft provided for the carrier.

5. An apparatus according to claim 1, wherein a spring constant of the first spring means is set to be larger than a spring constant of the second spring means.

6. An apparatus according to claim 5, wherein two coil springs are used as said first coil spring means, one coil spring is used as said second coil spring means, and coil springs having the same spring constant are used as said three coil springs.

* * * * *